United States Patent Office 3,140,182
Patented July 7, 1964

3,140,182
NON-IONIZED POLYMETHINE SENSITIZING
DYES
Donald W. Heseltine and Leslie G. S. Brooker, Rochester,
N.Y., assignors to Eastman Kodak Company, Rochester,
N.Y., a corporation of New Jersey
No Drawing. Filed June 11, 1963, Ser. No. 286,965
13 Claims. (Cl. 96—106)

This invention relates to non-ionized dyes, and more particularly to undissociated, trinuclear cyanine dyes, to methods for preparing such dyes and to photographic emulsions and elements containing these new dyes.

Polymethine dyes such as merocyanines, oxonols and holopolar cyanines prepared from cyclic α,α'-diketomethylene compounds such as 1,3-indanedione and 1,3-diethylbarbituric acid have been previously reported.

We have now found a new class of cyanine dyes prepared from certain derivatives of the four-membered compound 1,3-cyclobutane which are particularly useful as optical sensitizers for photographic silver halide emulsions and photographic elements produced therewith. The new cyanine dyes of the invention do not contain the conventional acid anions such as iodide, chloride, etc., and we have accordingly designated these new dyes as non-ionized dyes.

The new non-ionized dyes of our invention include those represented by one of the following structural formulas:

(I)

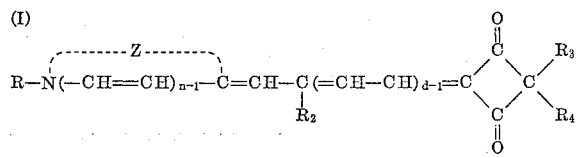

(IA)

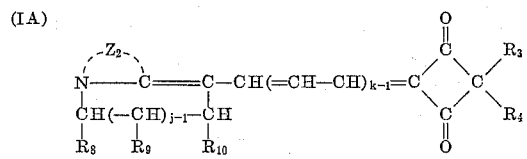

and (II)

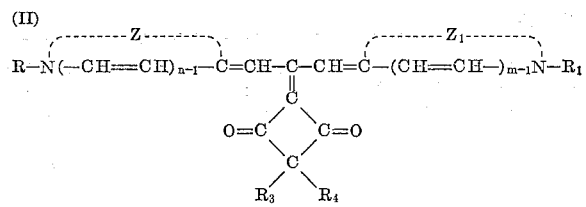

wherein $n$, $m$ and $d$ each represents a positive integer of from 1 to 2, R and $R_1$ each represents an alkyl group of from 1–12 carbon atoms, e.g., methyl, ethyl, n-propyl, isopropyl, n-butyl, isobutyl, sec. butyl, n-amyl, decyl, dodecyl, β-hydroxyethyl, γ-hydroxypropyl, β-methoxyethyl, β-ethoxyethyl, allyl, benzyl, β-phenylethyl, β-carboxyethyl, carboxymethyl, γ-carboxypropyl, β-acetoxyethyl, γ-acetoxypropyl, carbomethoxymethyl, β-carbethoxyethyl, etc., $R_2$ represents hydrogen or a methyl group, $R_3$ and $R_4$ each represents a group selected from the class consisting of the hydrogen atom, an alkyl group of from 1–12 carbon atoms, e.g., methyl, ethyl, propyl, isopropyl, butyl, sec. butyl, amyl, hexyl, heptyl, decyl, dodecyl, allyl, etc., groups or a phenyl, tolyl or benzyl group, or a carbalkoxy group wherein the alkoxy group contains from 1–4 carbon atoms such as carbethoxy, carbomethoxy group, etc., or together $R_3$ and $R_4$ supply the necessary carbon and hydrogen atoms to complete a carbocyclic ring having from 5 to 6 carbon atoms, such that at least one of the groups $R_3$ and $R_4$ does not represent the hydrogen atom, and Z and $Z_1$ each represents the non-metallic atoms necessary to complete a heterocyclic nucleus containing from 5 to 6 atoms in the heterocyclic ring, such as those selected from the group consisting of those of the thiazole series (e.g., thiazole, 4-methylthiazole, 5-methylthiazole, 4-phenylthiazole, 5-phenylthiazole, 4,5-dimethylthiazole, 4,5-diphenylthiazole, 4-(2-thienyl)thiazole, etc.), those of the benzothiazole series (e.g., benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 4-phenylbenzothiazole, 5-phenylbenzothiazole, 4-methoxybenzothiazole, 5-methoxybenzothiazole, 6-methoxybenzothiazole, 5-iodobenzothiazole, 6-iodobenzothiazole, 4-ethoxybenzothiazole, 5-ethoxybenzothiazole, tetrahydrobenzothiazole, 5,6-dimethoxybenzothiazole, 5,6-dioxymethylenebenzothiazole, 5-hydroxybenzothiazole, 6-hydroxybenzothiazole, etc.), those of the naphthothiazole series (e.g., α-naphthothiazole, β-naphthothiazole, 5-methoxy-β-naphthothiazole, 5-ethoxy-β-naphthothiazole, 7-methoxy-α-naphthothiazole, 8-methoxy-α-naphthothiazole, etc.), those of the thianaphtheno-7',6'-4,5-thiazole series (e.g., 4'-methoxythianaphtheno-7',6',4,5-thiazole, etc.), those of the oxazole series (e.g., 4-methyloxazole, 5-methyloxazole, 4-phenyloxazole, 4,5-diphenyloxazole, 4-ethyloxazole, 4,5-dimethyloxazole, 5-phenyloxazole, etc.), those of the benzoxazole series (e.g., benzoxazole, 5-chlorobenzoxazole, 5-phenylbenzoxazole, 5-methylbenzoxazole, 6-methylbenzoxazole, 5,6-dimethylbenzoxazole, 4,6-dimethylbenzoxazole, 5-methoxybenzoxazole, 6-methoxybenzoxazole, 5-ethoxybenzoxazole, 6-chlorobenzoxazole, 5-hydroxybenzoxazole, 6-hydroxybenzoxazole, etc.), those of the naphthoxazole series (e.g., α-naphthoxazole, β-naphthoxazole, etc.), those of the selenazole series (e.g., 4-methylselenazole, 4-phenylselenazole, etc.), those of the benzoselenazole series (e.g., benzoselenazole, 5-chlorobenzoselenazole, 5-methoxybenzoselenazole, 5-hydroxybenzoselenazole, tetrahydrobenzoselenazole, etc.), those of the naphthoselenazole series (e.g., α-naphthoselenazole, β-naphthoselenazole, etc.), those of the thiazoline series (e.g., thiazoline, 4-methylthiazoline, etc.), those of the 2-quinoline series (e.g., quinoline, 3-methylquinoline, 5-methylquinoline, 7-methylquinoline, 8-methylquinoline, 6-chloroquinoline, 8-chloroquinoline, 6-methoxyquinoline, 6-ethoxyquinoline, 6-hydroxyquinoline, 8-hydroxyquinoline, etc.), those of the 4-quinoline series (e.g., quinoline, 6-methoxyquinoline, 7-methylquinoline, 8-methylquinoline, etc.), those of the 1-isoquinoline series (e.g., isoquinoline, 3,4-dihydroisoquinoline, etc.), those of the 3,3-dialkylindolenine series (e.g., 3,3-dimethylindolenine, 3,3,5-trimethylindolenine, 3,3,7-trimethylindolenine, etc.), those of the 2-pyridine series (e.g., pyridine, 3-methylpyridine, 4-methylpyridine, 5-methylpyridine, 6-methylpyridine, 3,4-dimethylpyridine, 3,5-dimethylpyridine, 3,6-dimethylpyridine, 4,5-dimethylpyridine, 4,6-dimethylpyridine, 4-phenylpyridine, 5-chloropyridine, 6-chloropyridine, 3-hydroxypyridine, 4-hydroxypyridine, 5-hydroxypyridine, 6-hydroxypyridine, 3-phenylpyridine, 4-phenylpyridine, 6-phenylpyridine, etc.), those of the 4-pyridine series (e.g., 2-methylpyridine, 3-methylpyridine, 3-bromopyridine, 3-chloropyridine, 2,3-dimethylpyridine, 2,5-dimethylpyridine, 2,6-dimethylpyridine, 2-hydroxypyridine, 3-hydroxypyridine, etc.), etc., $R_8$, $R_9$ and $R_{10}$ each represents a member selected from the class consisting of the hydrogen atom, an alkyl group (e.g., methyl, ethyl, propyl, butyl, etc.) and an aryl group (e.g., phenyl, p-tolyl, o-tolyl, etc.), $j$ represents a positive integer of from 1 to 2, $k$ represents a positive integer of from 1 to 3, and $Z_2$ represents the non-metallic atoms necessary to complete a heterocyclic nucleus containing 5 atoms in the heterocyclic ring, such as, those selected from the group consisting of the thiazole series, those of the benzothiazole series, those of the naphthothiazole series, those of the thianaphtheno-7',6',4,5-thiazole series, those of the oxazole series, those of the benzoxazole series, those of the naphthoxazole series, those of the selenazole series, those of the benzoselenazole series, and those of the naphthoselenazole series (each of said series including the representative examples used to describe the same series for Z and $Z_1$) and those of the 1-alkylbenzimidazole series (e.g., 1 - methylbenzimidazole, 1-(γ-sulfopropyl)-4-chlorobenzimidazole, 1-(β-carboxyethyl)-5-chlorobenzimidazole, 1-(β-chloroethyl)-6-chlorobenzimidazole, 1-methyl-4-methylbenzimidazole, 1-(β-hydroxyethyl)-5-methoxybenzimidazole, 1-(β-acetoxyethyl)-6-hydroxybenzimidazole, etc.), and those of the 1-alkylnaphthimidazole series (e.g., 1-methylnaphth[2,3-d]-imidazole, 1-(ω-sulfobutyl)-4-chloronaphth[2,3-d]-imidazole, 1-ethyl-5-methylnaphth[2,3-d]imidazole, 1-ethylnaphth[1,2-d]imidazole, 1-butyl-6 - chloronaphth[1,2-d]imidazole, 1 - (β-carboxyethyl)-4-methylnaphth[2,1-d]imidazole, 1-ethyl-5-hydroxynaphth[2,1-d]imidazole, etc.). In addition to the above-defined dye compounds, the invention further contemplates non-ionized bis[2,2 - disubstituted - 1,3-cyclobutanedione(4)]-polymethine oxonol dyes, for example, as illustrated in following Example 8. Of these new dyes set forth above, the trinuclear dyes represented by above Formula II have been found to be especially efficacious sensitizers for photographic silver halide emulsions, and are preferred.

It is, accordingly, an object of the invention to provide a new class of non-ionized cyanine dyes. A further object is to provide methods for making these new dyes. A still further object is to provide photographic silver halide emulsions sensitized with these new dyes and photographic elements prepared with such emulsions. Another object is to provide methods for making such photographic materials. Other objects will become apparent from a consideration of the description and the following examples.

In accordance with our invention, we prepare the new non-ionized dyes represented by above Formula I wherein $d$ is 1 by reacting a 1,3-cyclobutanedione derivative having the general formula:

(III)

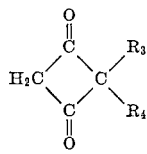

wherein $R_3$ and $R_4$ are as previously defined, with a cyclammonium quaternary salt selected from those represented by the following general formulas:

(IV)

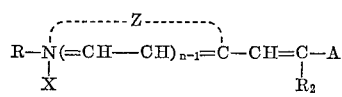

wherein R, $R_2$, $n$ and Z each have the values given above, A represents a group selected from —$SR_5$ and —$NR_6R_7$ wherein $R_5$ represents an alkyl group of from 1–12 carbon atoms, e.g., methyl to dodecyl, or an aryl group of from 6–7 carbon atoms, e.g., phenyl, p-tolyl, o-tolyl, etc., groups, $R_6$ represents an aryl group of from 6–7 carbon atoms and $R_7$ represents an acyl group, e.g. acetyl, propionyl, benzoyl, etc., and X represents an acid anion, e.g., chloride, bromide, iodide, thiocyanate, sulfamate, methyl sulfate, ethyl sulfate, perchlorate, p-toluenesulfonate, and the like. Where the symbol $d$ is the integer 2, a convenient method of preparation is as described in Example 5. The 1,3-cyclobutanedione derivative of above Formula III can be used in the reactions in either dione or enol forms.

The condensation reactions can be accelerated by heating up to reflux temperatures of the reaction mixture, preferably in an inert solvent such as ethanol, n-propanol, n-butanol, pyridine, quinoline, isoquinoline, etc. The reactants can be employed with an excess of one or the other, i.e., greater than the stoichiometrically calculated equivalents, but preferably in an approximately equimolar proportions for the best results. Advantageously, the condensations are carried out in the presence of a basic condensing agent such as a trialkylamine, e.g., triethylamine, tri-n-propylamine, tri-n-butylamine, N-methylpiperidine, N-ethylpiperidine, N,N-dimethylaniline, etc.

In accordance with our invention, the dyes of Formula IA, in which $k$ is the integer 2 or 3, are prepared to advantage by condensing a compound having the formula:

(A)

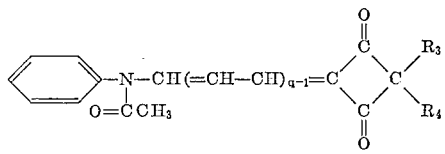

wherein $R_3$ and $R_4$ are as defined previously and $q$ is the integer 2 or 3, with a compound having the formula:

(B)

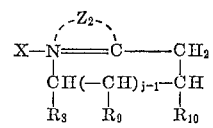

wherein X, $Z_2$, $R_8$, $R_9$, $R_{10}$ and $j$ are all as defined previously. The condensation reaction is conducted in the manner described for the preparation of compounds of Formula I.

Compounds of Formula A in which $q$ is 2 are prepared by the method illustrated by Example 9. Compounds of Formula A in which $q$ is 3 are prepared by the method of Example 9 but using glutaconicaldehydedianilide hydrochloride in place of β-analinoacroleinanil hydrochloride.

The dyes of Formula IA in which $k$ is the integer 1 are prepared to advantage by condensing a compound of Formula III with a compound having the formula:

(C)

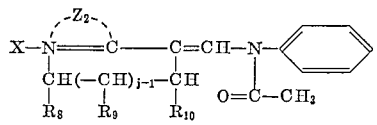

wherein X, $Z_2$, $R_8$, $R_9$, $R_{10}$ and $j$ are all as defined previously.

Compounds of Formula B in which $Z_2$ contains an oxygen, sulfur or selenium atom are prepared to advantage by the following syntheses:

A compound of the formula:

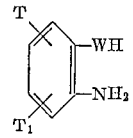

wherein W represents the sulfur atom, the selenium atom or the oxygen atom; and T and $T_1$ each represent the hydrogen atom, an alkyl group (e.g., methyl, ethyl, propyl, butyl, etc.), an aryl group (e.g., phenyl, etc.), a halogen atom (e.g., chlorine, bromine, iodine, etc.) or together T and $T_1$ contain the nonmetallic atoms necessary to complete a naphthalene compound, such as 1-amino-2-WH-naphthalene molecule, a 2-amino-3WH-naphthalene molecule, or a 2-amino-1-WH-naphthalene molecule (or derivative of each of these naphthalene compounds) is condensed with a lactone having the formula:

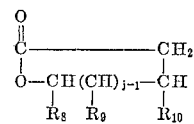

wherein $R_8$, $R_9$, $R_{10}$ and $j$ are as defined previously. This condensation is effected in the presence of an acid anion furnishing compound, such as phosphoryl chloride, hydrobromic acid, hydroiodic acid, hydrochloric acid, etc.

Compounds of Formula B in which $Z_2$ contains 2 nitrogen atoms, are prepared to advantage by the reaction of a 1,2-diaminobenzene, a 1,2-diaminonaphthalene or a 2,3-diaminonaphthalene compound with a lactone such as γ-butyrolactone (e.g., γ-butyrolactone, β-methyl-γ-butyrolactone, β-ethyl-γ-butyrolactone, β-propyl-γ-butyrolactone, β-butyl-γ-butyrolactone, β-phenyl-γ-butyrolactone, β,γ-dimethyl-γ-butyrolactone, γ-methyl-γ-butyrolactone, γ-ethyl-γ-butyrolactone, γ-propyl-γ-butyrolactone, β-phenyl-γ-methyl-γ-butyrolactone, etc.) or a δ-valerolactone (e.g., δ-valerolatcone, β-methyl-δ-valerolactone, β-ethyl-δ-valerolactone, β-propyl-δ-valerolactone, γ-methyl-δ-valerolactone, γ-ethyl-δ-valerolactone, δ-methyl-δ-valerolactone, δ-ethyl-δ-valerolactone, δ-propyl-δ-valerolactone, β-phenyl-δ-valerolactone, γ-phenyl-δ-valerolactone, β,γ-dimethyl-δ-valerolactone, β,γ,δ-trimethyl-δ-valerolactone, etc.). The diaminobenzene or diaminonaphthalene compound used is provided with the appropriate substituents so they will be present on the base formed. Alternatively these substituents can be substituted on the base after its formation. The cyclization reaction can be effected by heating the diaminobenzene or the diaminonaphthalene and lactone at atmospheric pressure or at an elevated pressure in an autoclave. In the presence of suitable solvents, such as diphenyl ether, or chlorobenzene the reaction can be effected at lower temperatures. The base is then converted to the quaternary salt by heating with the appropriate alkylating agent.

For the preparation of the preferred non-ionized trinuclear dyes of the invention corresponding to above Formula II, an intermediate is selected from those represented by above Formula I wherein $R_2$ is methyl group and wherein $d$ is 1. This intermediate is reacted with a cycloammonium quaternary salt selected from those represented by the following general formula:

(V) 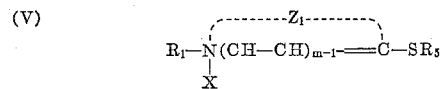

wherein $R_1$, $R_5$, $m$, X and $Z_1$ are as previously defined, employing an appreciable excess of the quaternary salt, at temperatures up to the reflux temperature of the mixture, in the presence of a basic condensation agent and an inert solvent such as mentioned above in the preparation of the intermediate. The dye product can be isolated from the reaction mixture by precipitation in a nonsolvent such as water and ether, followed by recrystallization from a lower alkanol such as methanol or ethanol.

The heterocyclic intermediates represented by above Formulas IV and V are described in Brooker and White U.S. Reissue 24,292, dated March 19, 1957. The cyclobutanedione intermediates represented by above Formula III can be prepared by the general processes described in copending application of James C. Martin, Serial No. 205,197 filed June 26, 1962, Hasek and Martin in J. Org. Chem., 27, p. 3743 (1962), Nieuwenhuis and Arens in Rec. Trav. Chim., 77, 1159 (1958), and Rosebeek and Arens in Rec. Trav. Chim., 81, 549—53 (1962), wherein various monoalkylketenes, dialkylketenes and diphenylketenes are reacted with an alkoxyacetylene, and the resultant alkoxy derivative is then hydrolyzed to the corresponding 2-mono-substituted-1,3-cyclobutanedione or 2,2-disubstituted-1,3-cyclobutanedione in normal dione or enol forms. Other suitable diketenes and mixed dialkylketenes for the above reaction are disclosed in copending application of James C. Martin, Serial No. 112,789, filed May 26, 1961.

The following examples will serve to illustrate more fully the manner whereby we prepare and use the new non-ionized dyes of our invention.

EXAMPLE 1

*4-[(3-Ethyl-2-Benzoxazolinylidene)Ethylidene]-2,2-Dimethyl-1,3-Cyclobutanedione*

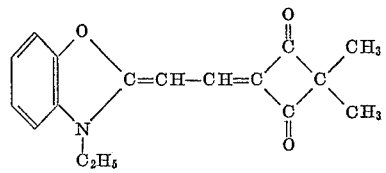

2,2-dimethyl-1,3-cyclobutanedione (0.56 g., 1 mol.) and 2-β-acetanilidovinyl-3-ethylbenzoxazolium iodide (2.18 g., 1 mol.) and triethylamine (1.4 ml., 1 mole+100%) were dissolved in ethanol (10 ml.) and the mixture heated under reflux for ten minutes. After chilling, the reaction mixture was diluted with chloroform (1000 ml.) and washed with several 100 ml. portions of water. After drying, the chloroform solution was chromatographed on a 12-inch column of neutral alumina 1 inch in diameter. After concentrating the desired fraction, the residue was twice recrystallized from benzene. The yield of purified dye was 1.1 g. (79%), M.P. 188–190° C., dec.

EXAMPLE 2

*4-[(3-Ethyl-2-Benzothiazolinylidene)Ethylidene]-2,2-Dimethyl-1,3-Cyclobutanedione*

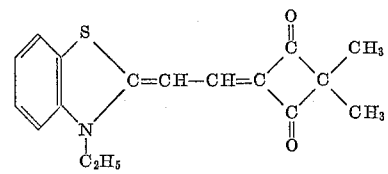

2,2-dimethyl-1,3-cyclobutanedione (0.56 g., 1 mol.), 2-β-acetanilidovinyl-3-ethylbenzothiazolium iodide (2.25 g., 1 mol.) and triethylamine (1.4 ml.+100%) were dissolved in ethanol (10 ml.) and heated under reflux for ten minutes. After chilling, the reaction mixture was diluted with chloroform (1000 ml.) and washed several times with 100 ml. portions of water. After filtering and drying, the chloroform solution was separated on a 12-inch neutral alumina column 1 inch in diameter. The desired fraction was concentrated to dryness and the residue stirred with methanol (10 ml.), chilled and the crude dye was collected on a funnel. After two recrystallizations from methanol, the yield of purified dye was 0.70 g. (47%), M.P. 257–9° C., dec.

EXAMPLE 3

*4-[(3-Ethyl-2-Benzothiazolinylidene)Isopropylidene]-2,2-Dimethyl-1,3-Cyclobutanedione*

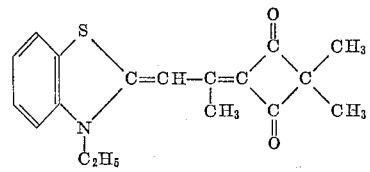

2,2-dimethyl-1,3-cyclobutanedione (0.56 g., 1 mol.), 3-ethyl-2-ethylthiopropenylbenzothiazolium ethyl sulfate (2.06 g., 1 mol.+10%) and triethylamine (1.4 ml., 1 mol.+100%) were dissolved in pyridine (10 ml.) and heated under reflux for ten minutes. After chilling, the crude dye was collected on a funnel, washed with methanol and dried. The dye was purified by dissolving in hot pyridine, filtering and adding methanol to the filtrate to bring the dye out of solution. After two such treatments, the yield of purified dye was 1.0 g. (64%), M.P. 289–290° C., dec.

EXAMPLE 4

*4-[(1-Ethylnaphtho[1,2-d]Thiazolin-2-Ylidene)Isopropylidene]-2,2-Dimethyl-1,3-Cyclobutanedione*

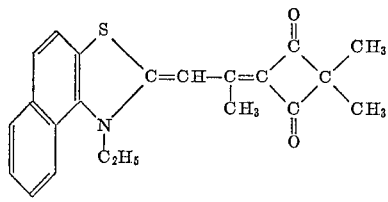

1 - ethyl-2-thioacetonylidenenaphtho[1,2 - d]thiazoline (1.56 g., 1 mol.+10%) and methyl p-toluenesulfonate (1.02 g., 1 mol +10%) were mixed and fused in a flask over a free flame. After cooling 2,2-dimethyl-1,3-cyclobutanedione (0.56 g., 1 mol.), triethylamine (1.4 ml., 1 mol.+100%) and pyridine (10 ml.) were added. The mixture was then heated under reflux for ten minutes, chilled and the crude dye collected on a filter. The dye was purified by dissolving in hot pyridine, filtering and precipitating the dye from the filtrate by the addition of methanol. After two such treatments, the yield of purified dye was 0.97 g. (54%), M.P. >300° C.

EXAMPLE 5

*4-[4-(3-Ethyl-2-Benzothiazolinylidene)-2 - Butenylidene]-2,2-Dimethyl-1,3-Cyclobutanedione*

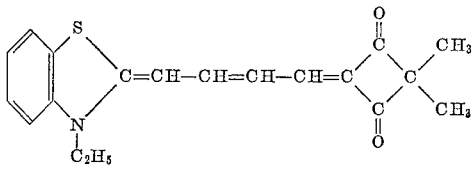

4-(3-acetanilidoallylidene) - 2,2-dimethyl-1,3-cyclobutanedione prepared according to Example 9 (1.42 g., 1 mol.), 3-ethyl-2-methylbenzothiazolium p-toluenesulfonate (1.85 g., 1 mol.+10%) and triethylamine (1.4 ml., 1 mol.+100%) were dissolved in ethanol (10 ml.) and heated under reflux for five minutes. After chilling, the crude dye was collected on a filter, washed with a little ethanol and dried. After two recrystallizations from ethanol, the yield of purified dye was 0.4 g. (25%), M.P. 232-3° C., dec.

EXAMPLE 6

*4-[1,3-Di(3-Ethyl - 2 - Benzothiazolinylidene)Isopropylidene]-2,2-Dimethyl-1,3-Cyclobutanedione*

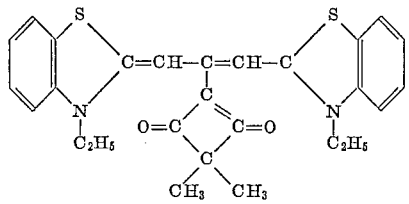

4-[(3-ethyl-2 - benzothiazolinylidene)isopropylidene]-2,2-dimethyl-1,3-cyclobutanedione prepared according to Example 3 (0.62 g., 1 mol.) and 3-ethyl-2-ethylmercaptobenzothiazolium ethylsulfate (1.40 g., 1 mol.+100%) were suspended in pyridine (10 ml.) and triethylamine (1.4 ml., 1 mol.+400%) was added. After heating under reflux for ten minutes, the reaction mixture was cooled and stirred with water (100 ml.) and ether (100 ml.). After chilling overnight, the crude dye was collected on a filter and dried. The yield of purified dye was 0.52 g. (55%) after two recrystallizations from ethanol, M.P. 292-3° C., dec.

The sensitizing dye of this mixture can also be illustrated more generally in its holopolar structural form as follows:

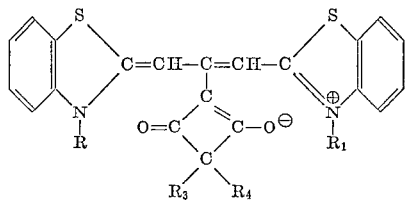

wherein R, $R_1$, $R_3$ and $R_4$ are the specific groups of this example or defined equivalents thereof.

EXAMPLE 7

*4-[1,3 - Di-(3-Ethylnaphtho[1,2-d]Thiazolin - 2-Ylidene)Isopropylidene]-2,2-Dimethyl-1,3-Cyclobutanedione*

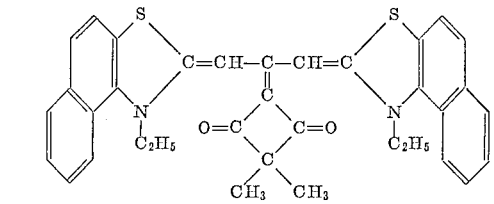

4-[(1-ethylnaphtho[1,2 - d]thiazolin-2-ylidene)isopropylidene]2,2-dimethyl-1,3-cyclobutanedione prepared according to Example 4 (0.72 g., 1 mol.) and 1-ethyl-2-ethylmercaptonaphtho[1,2 - d]thiazolium p - toluenesulfonate (1.77 g., 1 mol.+100%) were suspended in pyridine (10 ml.), triethylamine (1.4 ml., 1 mol.+400%) added and the mixture heated under reflux for ten minutes. After cooling, the mixture was stirred with water (100 ml.) and ether (100 ml.) until the dye became crystalline. The mixture was chilled overnight, the crude dye collected on a filter, washed with ether and dried. After two recrystallizations from ethyl alcohol, the yield of purified dye was 0.50 g. (43%), M.P. >310° C.

The sensitizing dye of this example can also be illustrated more generally in its holopolar structural form as follows:

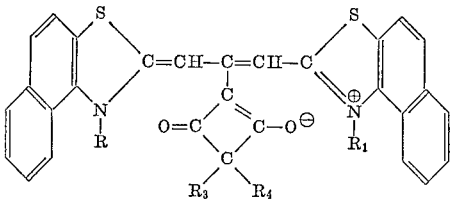

wherein R, $R_1$, $R_3$ and $R_4$ are the specific groups of this example or defined equivalents thereof.

EXAMPLE 8

*Bis[2,2-Dimethyl - 1,3 - Cyclobutanedione(4)Trimethine Oxonol*

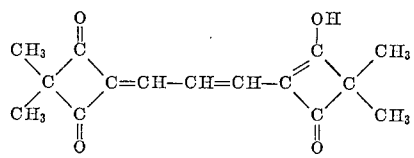

2,2-dimethyl-1,3-cyclobutanedione (1.12 g., 1 mol.) and 1,1,3-trimethoxypropene (2.64 g., 1 mol.+300%) were added to pyridine (10 ml.) and heated rapidly to reflux over a free flame. After cooling, the crude dye was precipitated with ether and the sticky residue washed with ether. The residue was dissolved in a little methanol, filtered, acidified with hydrochloric acid and the solid collected on a filter. After recrystallizing the crude dye from methanol, the yield of purified dye was 0.20 g. (14%), M.P. 174-6° C.

EXAMPLE 9

*4-(3-Acetanilidoallylidene)-2,2-Dimethyl-1,3-Cyclobutanedione*

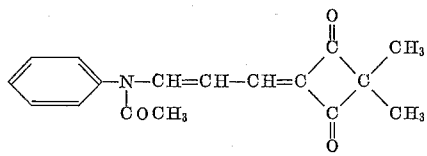

2,2-dimethyl-1,3-cyclobutanedione (5.6 g., 1 mol.) and β-anilinoacroleinanil hydrochloride (13 g., 1 mol.) were suspended in acetic anhydride and heated rapidly to reflux. After two minutes the mixture was chilled in an ice and acetone bath and the product collected on a filter. The crude product was washed with cold acetic anhydride, dried and used in dye condensations without further purification. Yield 6.1 g. (43%).

EXAMPLE 10

*4 - [5 - (5 - Ethyl - 3 - Methyl - 4(5H) - Piperidino[1,2-a]Benzimidazolyl) - 2,4 - Pentadienylidene] - 2,2 - Dimethyl-1,3-Cyclobutanedione*

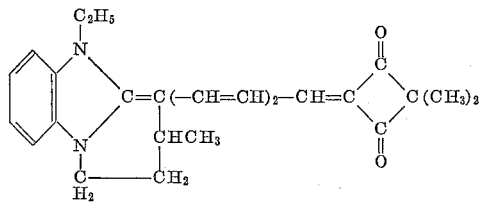

5 - ethyl - 3 - methylpiperidino[1,2 - a]benzimidazolium p-toluenesulfonate (1.93 g., 1 mol.), 4-(5-acetanilido-2,4-pentadienylidene) - 2,2 - dimethyl - 1,3 - cyclobutanedione (1.47 g., 1 mol.) and triethylamine (1.4 ml., 1 mol.+100%) were dissolved in pyridine (15 ml.) and heated under reflux for ten minutes. The reaction mixture was cooled and the crude dye product precipitated by adding diethyl ether. The pyridine and ether were decanted and the crude dye residue was dissolved in chloroform. The dye was isolated by column chromatography on neutral alumina. The pure dye was obtained by drying the dye containing fraction and recrystallizing the dye from ethanol.

In the preparation of photographic emulsions, the new dyes of the invention are advantageously incorporated in the washed, finished silver halide emulsion and should, of course, be uniformly distributed throughout the emulsion. The methods of incorporating dyes in emulsions are relatively simple and well known to those skilled in the art of emulsion making. For example, it is convenient to add the dyes from solutions in appropriate solvents, in which case the solvent selected should be completely free from any deleterious effect on the ultimate light-sensitive materials. Methanol, isopropanol, pyridine, etc., alone or in admixtures, have proven satisfactory as solvents for the majority of our new dyes. The type of silver halide emulsions that can be sensitized with the new dyes include any of those prepared with hydrophilic colloids that are known to be satisfactory for dispersing silver halides, for example, emulsions comprising natural materials such as gelatin, albumin, agar-agar, gum arabic, alginic acid, etc. and hydrophilic synthetic resins such as polyvinyl alcohol, polyvinyl pyrrolidone, cellulose ethers, partially hydrolyzed cellulose acetate, and the like.

The concentration of our new dyes in the emulsion can vary widely, i.e., from about 5 to about 100 mgs. per liter of flowable emulsion. The specific concentration will vary according to the type of light-sensitive material in the emulsion and according to the effects desired. The suitable and most economical concentration for any given emulsion will be apparent to those skilled in the art upon making the tests and observations customarily used in the art of emulsion making.

To prepare a gelatino-silver halide emulsion sensitized with one of our new dyes, the following procedure is satisfactory: A quantity of the dye is dissolved in a suitable solvent and a volume of this solution containing from 5 to 100 mgs. of dye is slowly added to about 1000 cc. of a gelatino-silver halide emulsion. With most of our dyes, 10 to 20 mgs. of dye per liter of emulsion suffice to produce the maximum sensitizing effect with the ordinary gelatino-silver bromide (including bromoiodide and chlorobromide) emulsions. With fine-grain emulsions, which include most of the ordinary employed gelatino-silver chloride emulsions, somewhat larger concentrations of dye may be necessary to secure optimum sensitizing effect. While the preceding has dealt with emulsions comprising gelatin, it will be understood that these remarks apply generally to any emulsions wherein part or all of the gelatin is substituted by another suitable hydrophilic colloid such as mentioned above.

The above statements are only illustrative and are not to be understood as limiting our invention in any sense, as it will be apparent that our new dyes can be incorporated by other methods in many of the photographic silver halide emulsions customarily employed in the art. For instance, the dyes can be incorporated by bathing a plate or film upon which an emulsion has been coated, in the solution of the dye in an appropriate solvent. Bathing methods, however, are not to be preferred ordinarily.

Photographic silver halide emulsions, such as those listed above, containing the sensitizing dyes of our invention can also contain such addenda as chemical sensitizers, e.g., sulfur sensitizers (e.g., allyl thiocarbamide, thiourea, allylisothiocyanate, cystine, etc.), various gold compounds (e.g., potassium chloroaurate, auric trichloride, etc.) (see U.S. patents to W. D. Baldsiefen, 2,540,085, granted February 6, 1951; R. E. Damschroder, 2,597,856, granted May 27, 1952; and H. C. Yutzy et al., 2,597,915, granted May 27, 1952); various palladium compounds, such as palladium chloride (W. D. Baldsiefen, U.S. 2,540,086, granted February 6, 1951); potassium chloropalladate (R. E. Stauffer et al., U.S. 2,598,079, granted May 27, 1952), etc., or mixture of such sensitizers; antifoggants, such as ammonium chloroplatinate (A. P. H. Trivelli et al., U.S. 2,566,245, granted August 28, 1951); ammonium chloroplatinite (A. P. H. Trivelli et al., U.S. 2,566,263, granted August 28, 1951); benzotriazole, nitrobenzimidazole, 5-nitroindazole, benzidine, mercaptans, etc. (see Mees, "The Theory of the Photographic Process," Macmillan Pub., 1942, page 460), or mixtures thereof; hardeners, such as formaldehyde (A. Miller, U.S. 1,763,533, granted June 10, 1930); chrome alum (U.S. 1,763,533); glyoxal (J. Brunken, U.S. 1,870,354, granted August 9, 1932); dibromacrolein (O. Block et al., British 406,750, accepted March 8, 1934), etc.; color couplers, such as those described in I. F. Salminen et al., U.S. Patent 2,423,730, granted July 7, 1947; Spence and Carroll, U.S. Patent 2,640,776, issued June 2, 1953, etc.; or mixtures of such addenda. Dispersing agents for color couplers, such as those set forth in U.S. patents to E. E. Jelley et al., 2,322,027, granted June 15, 1943, and L. D. Mannes et al., 2,304,940, granted December 15, 1942, can also be employed in the above-described emulsions.

The sensitizing effect of several of the new dyes of our invention is illustrated in the following tabulation where the sensitizing range and sensitizing maximum values are shown for these dyes. The dyes were tested in a silver bromoiodide emulsion containing 0.77 mole percent iodide of the type described by Trivelli and Smith, Phot. Journal, 79, 330 (1939). The dyes, dissolved in suitable solvents, were added to separate portions of the emulsion in amounts in the range from about 40 to 130 mg./mole of silver halide. After digestion at 50° C. for 10 minutes, the emulsions were coated at a coverage of 432 mg. of Ag/ft.$^2$ on a cellulose acetate film support. A sample of each coating was exposed on a sensitometer and to a wedge spectrograph, processed for 3 minutes in developer, fixed, washed and dried.

SENSITIZING DATA

| Dye of Example Number | Sensitizing Range (mμ) | Sensitizing Maximum (mμ) | Emulsion Type |
|---|---|---|---|
| 5 | To 530 | | Bromoiodide. |
| 6 | 500–650 | 600 | Chlorobromide. |
|   | 500–650 | 600 | Bromoiodide. |
| 7 | 500–670 | 620 | Chlorobromide. |
|   | 500–700 | 670 | Bromoiodide. |

Examples 6 and 7 represent the preferred trinuclear dyes.

Although the photographic element example shows coatings made on cellulose acetate supports, it is to be understood that our photographic silver halide emulsions are coated advantageously on any of the support materials used in photographic elements, including glass, paper, cellulose acetate, cellulose nitrate, and synthetic film-forming resinous materials, such as, the polystyrenes, the polyesters, the polyamides, etc.

The invention has been described in detail with particular reference to preferred embodiments thereof, but it will be understood that variations and modifications can be effected within the spirit and scope of the invention as described hereinabove and as defined in the appended claims.

We claim:

1. A non-ionized dye selected from those represented by the following general formulas:

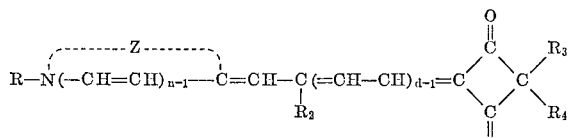

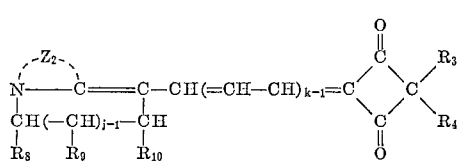

and

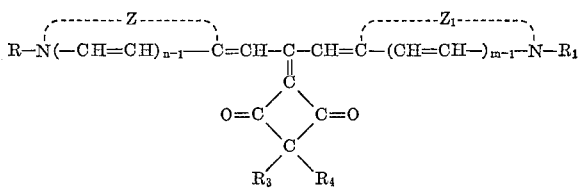

wherein $n$, $m$ and $d$ each represents a positive integer of from 1 to 2, R and $R_1$ each represents an alkyl group of from 1 to 12 carbon atoms, $R_2$ represents a member selected from the group consisting of the hydrogen atom and a methyl group, $R_3$ and $R_4$ are selected from the group consisting of the hydrogen atom, an alkyl group of from 1 to 12 carbon atoms, a phenyl group, a benzyl group, a tolyl group, a carbalkoxy group wherein the said alkoxy group contains from 1 to 4 carbon atoms, and together supply the necessary carbon and hydrogen atoms to complete a carbocyclic ring having from 5 to 6 carbon atoms, such that at least one of $R_3$ and $R_4$ does not represent the hydrogen atom, and Z and $Z_1$ each represents the non-metallic atoms necessary to complete a heterocyclic nucleus containing from 5 to 6 atoms in a heterocyclic ring, $R_8$, $R_9$ and $R_{10}$ each represents a member selected from the class consisting of the hydrogen atom, an alkyl group and an aryl group, $j$ represents a positive integer of from 1 to 2, $k$ represents a positive integer of from 1 to 3, and $Z_2$ represents the non-metallic atoms necessary to complete a heterocyclic nucleus containing 5 atoms in the heterocyclic ring.

2. A non-ionized cyanine dye having the general formula:

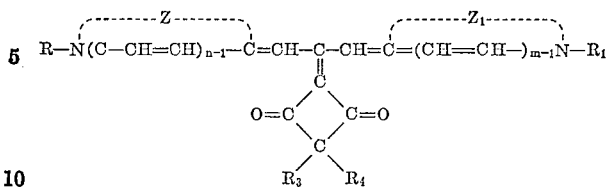

wherein $n$ and $m$ each represents a positive integer of from 1 to 2, R and $R_1$ each represents an alkyl group of from 1–12 carbon atoms, $R_3$ and $R_4$ each represents a member selected from the group consisting of the hydrogen atom, an alkyl group of from 1–12 carbon atoms, a phenyl group, a benzyl group, a tolyl group, a carbalkoxy group wherein the said alkoxy group contains from 1–4 carbon atoms, and together supply the necessary carbon and hydrogen atoms to complete a carbocyclic ring having from 5 to 6 carbon atoms, such that at least one of $R_3$ and $R_4$ does not represent the hydrogen atom, and Z and $Z_1$ each represents the non-metallic atoms necessary to complete a heterocyclic nucleus containing from 5 to 6 atoms in a heterocyclic ring.

3. A non-ionized cyanine dye having the general formula:

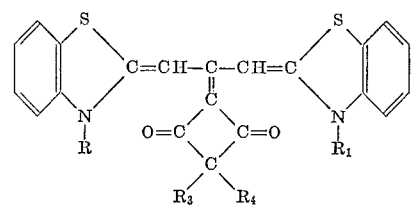

wherein R, $R_1$, $R_3$ and $R_4$ each represents an alkyl group containing from 1–12 carbon atoms.

4. A non-ionized cyanine dye having the general formula:

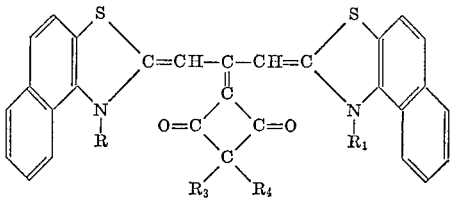

wherein R, $R_1$, $R_3$ and $R_4$ each represents an alkyl group containing from 1–12 carbon atoms.

5. The non-ionized cyanine dye having the formula:

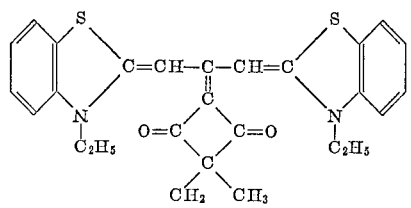

6. The non-ionized cyanine dye having the formula:

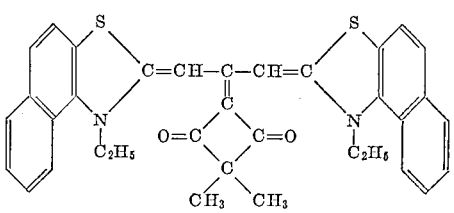

7. A light-sensitive photographic emulsion comprising a hydrophilic colloid, light-sensitive silver halide and a non-ionized dye selected from those represented by the following general formulas:

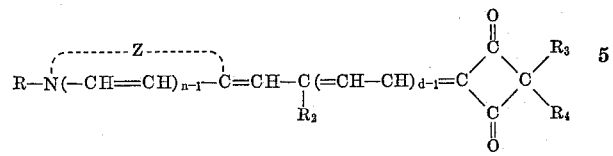

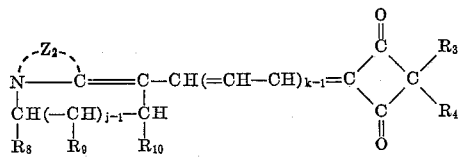

and

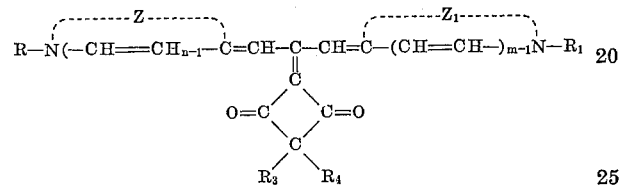

wherein $n$, $m$ and $d$ each represents a positive integer of from 1 to 2, R and $R_1$ each represents an alkyl group of from 1 to 12 carbon atoms, $R_2$ represents a member selected from the group consisting of the hydrogen atom and a methyl group, $R_3$ and $R_4$ each represents a member selected from the group consisting of an alkyl group of from 1 to 12 carbon atoms, a phenyl group, a benzyl group, a tolyl group, a carbalkoxy group wherein the said alkoxy group contains from 1 to 4 carbon atoms, and together supply the necessary carbon and hydrogen atoms to complete a carbocyclic ring having from 5 to 6 carbon atoms, such that at least one of $R_3$ and $R_4$ does not represent the hydrogen atom, and Z and $Z_1$ each represents the non-metallic atoms necessary to complete a heterocyclic nucleus containing from 5 to 6 atoms in a heterocyclic ring, $R_8$, $R_9$ and $R_{10}$ each represents a member selected from the class consisting of the hydrogen atom, an alkyl group and an aryl group, $j$ represents a positive integer of from 1 to 2, $k$ represents a positive integer of from 1 to 3, and $Z_2$ represents the non-metallic atoms necessary to complete a heterocylic nucleus containing 5 atoms in the heterocyclic ring.

8. A light-sensitive photographic emulsion comprising a hydrophilic colloid, light-sensitive silver halide and a non-ionized cyanine dye having the general formula:

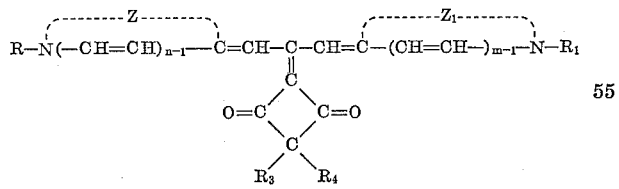

wherein $n$ and $m$ each represents a positive integer of from 1 to 2, R and $R_1$ each represents an alkyl group of from 1-12 carbon atoms, $R_3$ represents a member selected from the group consisting of the hydrogen atom and a methyl group, $R_3$ and $R_4$ each represents a member selected from the group consisting of an alkyl group of from 1-12 carbon atoms, a phenyl group, a benzyl group, a tolyl group, a carbalkoxy group wherein the said alkoxy group contains from 1-4 carbon atoms, and together supply the necessary carbon and hydrogen atoms to complete a carbocyclic ring having from 5 to 6 carbon atoms, such that at least one of $R_3$ and $R_4$ does not represent the hydrogen atom, and Z and $Z_1$ each represents the non-metallic atoms necessary to complete a heterocyclic nucleus containing from 5 to 6 atoms in a heterocyclic ring.

9. A light-sensitive photographic emulsion comprising a hydrophilic colloid, light-sensitive silver halide and a non-ionized cyanine dye having the general formula:

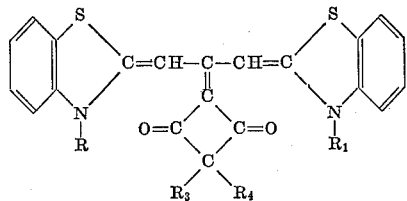

wherein R, $R_1$, $R_3$ and $R_4$ each represents an alkyl group containing from 1–12 carbon atoms.

10. A light-sensitive photographic emulsion comprising a hydrophilic colloid, light-sensitive silver halide and a non-ionized cyanine dye having the general formula:

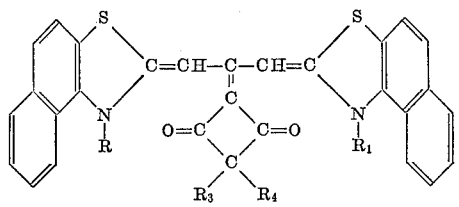

wherein R, $R_1$, $R_3$ and $R_4$ each represents an alkyl group containing from 1–12 carbon atoms.

11. A light-sensitive photographic emulsion comprising a hydrophilic colloid, light-sensitive silver halide and the non-ionized cyanine dye of the formula:

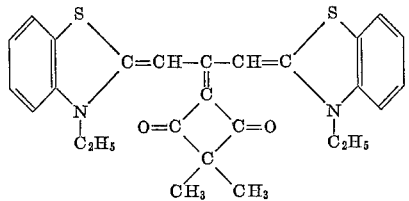

12. A light-sensitive photographic emulsion comprising a hydrophilic colloid, light-sensitive silver halide and the non-ionized cyanine dye of the formula:

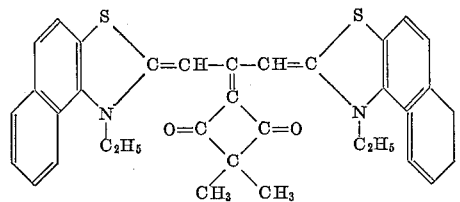

13. A light-sensitive photographic element comprising a support material, and at least one hydrophilic colloid layer containing light-sensitive silver halide and a non-ionized dye selected from those represented by the following formulas:

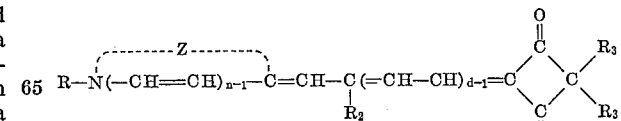

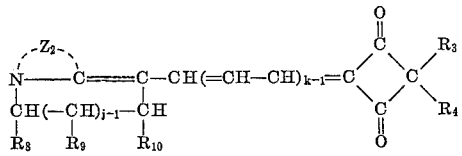

and

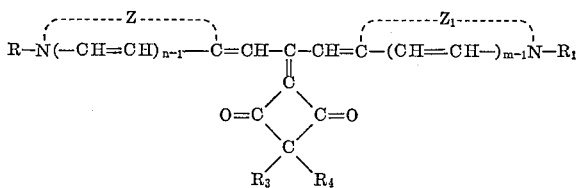

wherein $n$, $m$ and $d$ each represents a positive integer of from 1 to 2, $R$ and $R_1$ each represents an alkyl group of from 1 to 12 carbon atoms, $R_2$ represents a member selected from the group consisting of the hydrogen atom and a methyl group, $R_3$ and $R_4$ each represents a member selected from the group consisting of hydrogen, an alkyl group of from 1 to 12 carbon atoms, a phenyl group, a benzyl group, a tolyl group, a carbalkoxy group wherein the said alkoxy group contains from 1 to 4 carbon atoms, and together supply the necessary carbon and hydrogen atoms to complete a carbocyclic ring having from 5 to 6 carbon atoms, such that at least one of $R_3$ and $R_4$ does not represent the hydrogen atom and $Z$ and $Z_1$ each represents the non-metallic atoms necessary to complete a heterocyclic nucleus containing from 5 to 6 atoms in a heterocyclic ring, $R_8$, $R_9$ and $R_{10}$ each represents a member selected from the class consisting of the hydrogen atom, an alkyl group and an aryl group, $j$ represents a positive integer of from 1 to 2, $k$ represents a positive integer of from 1 to 3, and $Z_2$ represents the non-metallic atoms necessary to complete a heterocyclic nucleus con- containing 5 atoms in the heterocyclic ring.

References Cited in the file of this patent
UNITED STATES PATENTS

| | | |
|---|---|---|
| 2,895,955 | Haseltine et al. | July 21, 1959 |
| 2,955,939 | Brooker et al. | Oct. 11, 1960 |
| 2,965,486 | Brooker et al. | Dec. 20, 1960 |
| 2,984,664 | Fry et al. | May 16, 1961 |